United States Patent [19]

Chen

[11] Patent Number: 4,648,976

[45] Date of Patent: Mar. 10, 1987

[54] INTEGRAL WATER DEMINERALIZER SYSTEM AND METHOD

[75] Inventor: James Y. Chen, Florham Park, N.J.

[73] Assignee: Belco Pollution Control Corporation, Parsippany, N.J.

[21] Appl. No.: 709,738

[22] Filed: Mar. 7, 1985

[51] Int. Cl.$^4$ .............................................. C02F 1/42
[52] U.S. Cl. ................................... 210/678; 210/686; 210/275; 210/284
[58] Field of Search .............. 210/685, 686, 274, 275, 210/283, 284, 290, 670, 678, 687

[56] References Cited

U.S. PATENT DOCUMENTS

| | | | |
|---|---|---|---|
| 3,136,719 | 6/1964 | Serra | 210/284 |
| 3,455,819 | 7/1969 | Crits | 210/274 |
| 3,497,069 | 2/1970 | Lindenthal et al. | 210/283 |
| 3,527,718 | 9/1970 | Coburn | 210/686 |
| 3,985,648 | 10/1976 | Casolo | 210/686 |
| 4,321,145 | 3/1982 | Carlson | 210/678 |
| 4,383,920 | 5/1983 | Muller et al. | 210/284 |

FOREIGN PATENT DOCUMENTS

| | | |
|---|---|---|
| 8204197 | 12/1982 | European Pat. Off. . |
| 1005981 | 9/1965 | United Kingdom . |
| 1228366 | 4/1971 | United Kingdom . |
| 1305373 | 1/1973 | United Kingdom . |
| 1407099 | 9/1975 | United Kingdom . |
| 1432020 | 4/1976 | United Kingdom . |
| 2008968 | 6/1979 | United Kingdom . |
| 2063094 | 6/1981 | United Kingdom . |

*Primary Examiner*—Ivars Cintins
*Attorney, Agent, or Firm*—Marvin A. Naigur; John E. Wilson; Martin Smolowitz

[57] ABSTRACT

A water demineralizer system and method is provided in which at least three beds of resin particles are connected in series flow arrangement preferably within a single vessel for substantially removing metal ions such as calcium and magnesium from water feed by exchange with hydrogen ions. The raw feed water flows first through an upper cation resin bed, then through an intermediate anion resin bed, and then through a lower bed of mixed cation and anion resins, and preferably flows downwardly through the beds. After the resin beds become saturated with metal ions from the feed water, mainly by calcium and magnesium ions, the beds are regenerated by first backwashing with water, then chemically treating with acid and caustic solution, followed by bed rinsing, air mixing and backflushing with water prior to further use for demineralizing the feed water.

15 Claims, 1 Drawing Figure

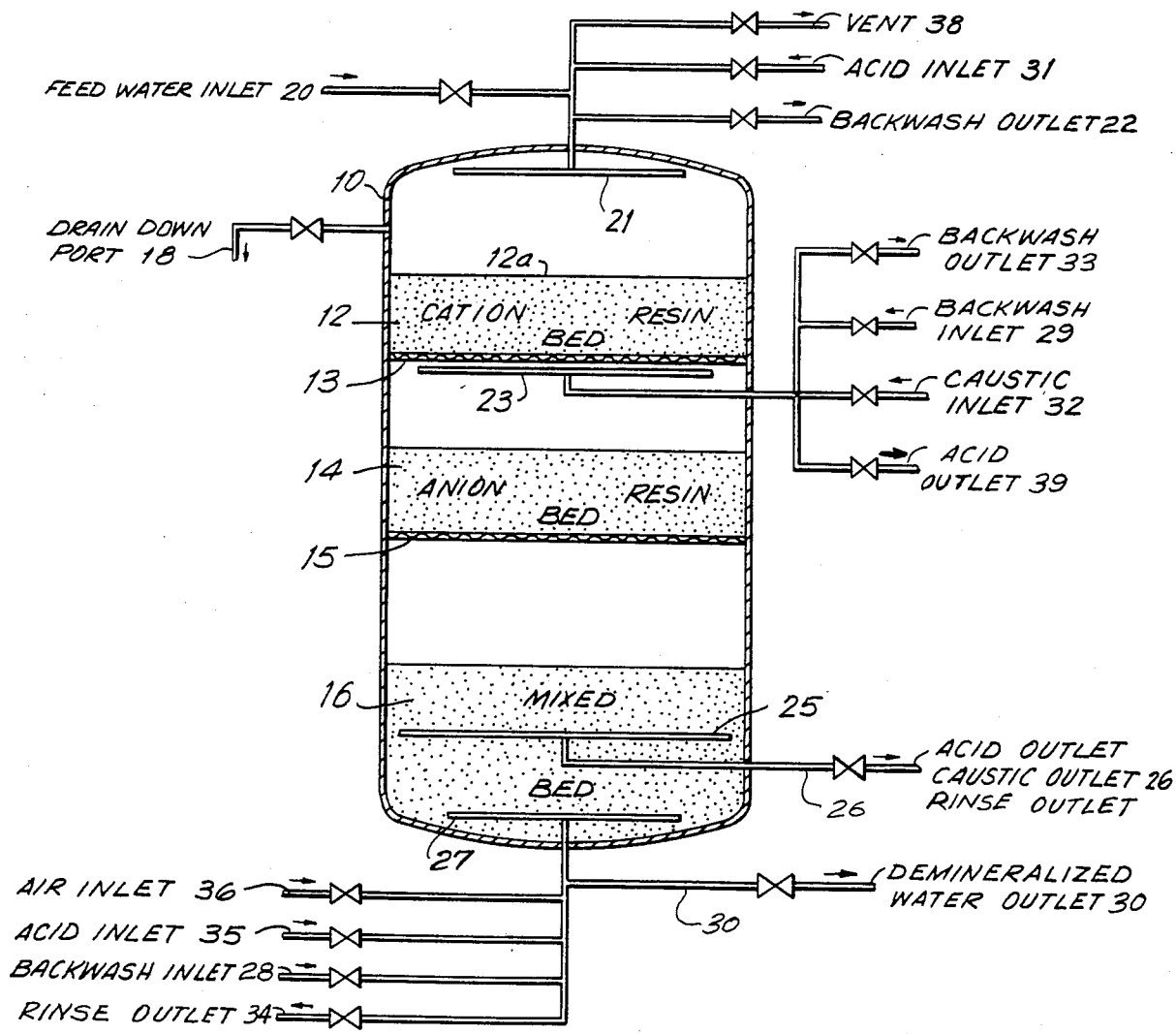

INTEGRAL WATER DEMINERALIZER SYSTEM AND METHOD

BACKGROUND OF INVENTION

The invention pertains to a water demineralization system usually in a single vessel containing multiple beds of ion exchange resins. It pertains particularly to a water demineralization system and method for which beds of cationic resins, anionic resins and mixed cationic and anionic resins are provided in a single vessel in a series flow arrangement, including a method for rapidly regenerating the resin beds.

Demineralization or softening of water to remove minerals such as calcium and magnesium compounds using ion exchange type resins in a single vessel is generally known. For example, U.S. Pat. No. 2,772,236 to Coonradt et al discloses a single vessel demineralizer system containing a series of ion exchange resin beds. U.S. Pat. No. 2,703,313 to Gill discloses a similar single vessel demineralization system adapted to use multiple beds of fine resin particles. U.S. Pat. No. 3,355,018 to Smith discloses a single vessel containing four beds of ion exchange resins connected in continuous series arrangement, but makes no provision for separate regeneration of the resin beds. U.S. Pat. No. 4,159,350 to Jonsson discloses a single vessel demineralizer having an anion bed and a cation bed in series flow arrangement. Also, U.S. Pat. No. 4,263,145 to Wirth discloses a single vessel containing a mixture of anion and cation resins.

Although the prior art has provided some single vessel systems for demineralization of water, further improvements in the demineralization of water including methods for rapid regeneration of the resin beds are needed for providing demineralized water of high quality and at reduced costs, particularly for steam boiler applications.

SUMMARY OF INVENTION

The present invention provides a system and method for demineralizing water using multiple beds of ion exchange resins, usually contained in a single vessel. In the system, three beds of ion exchange resin particles are provided in series flow arrangement, a first bed containing a cation type resin, an intermediate second bed containing an anion resin, and a third bed containing a mixture of cationic and anionic resins. The first bed is preferably located at the vessel upper end, and the beds are separated vertically so as to provide for their separate flushing and regeneration. The raw feed water to be demineralized flows through the beds of cation resin, anion resin, and mixed cation and anion resins successively in a series flow arrangement.

In this water demineralizer system and method, the three resin beds are preferably provided in a single vessel. Alternatively if desired, two adjacent beds can be advantageously provided in one vessel and the third bed provided in a separate or second vessel interconnected to the first vessel by suitable flow conduit means, and with provision for flushing and regeneration of the resin beds.

More specifically, the present invention provides a system for demineralizing raw water using multiple beds of resins connected in a series flow arrangement, comprising a pressurizable first vessel containing at least two beds of ion exchange resins; a first bed containing a cation type particulate resin material, said first bed being located in the upper portion of said first vessel; and second bed containing an anion type resin, said second bed being located in the lower portion of said first vessel; a second vessel containing a mixed bed of cation and anion type resins; and conduit and valve means connected to said first and second vessels for flowing feed water to the first and second vessels and for flushing and regenerating said cation, anion and mixed resin beds.

When the raw feed water flow causes the resins to become saturated with dissolved solids such as calcium, magnesium, sodium, sulfates, chlorides and alkaline ions from the water, the beds are regenerated by using an improved sequence of backwashing the beds with water, then flowing an acid and a caustic solution through the beds, followed by air mixing and rinsing with water. Thus, in another aspect of this invention, it provides a method for demineralizing water using multiple beds of ion exchange resin connected in series flow arrangement, said method comprising flowing raw feed water first through a cation resin bed to remove dissolved solids from the water; further flowing the feed water through an anion resin bed to remove further dissolved solids from the water; then flowing the feed water through a bed of mixed cation and anion resins to substantially remove all dissolved solids from the water; flushing the beds with water, then regenerating the cation resin with an acid solution and regenerating the anion resin with caustic solution to remove the dissolved solids; and rinsing the beds with water.

It is an advantage of the present invention that raw feed water containing dissolved solids can be conveniently and effectively demineralized by using a single vessel containing three beds of resins connected in series arrangement. The single vessel system advantageously replaces demineralizer systems using three separate vessels with appreciable associated savings in material and piping costs, as well as in space and installation requirements. Furthermore, by using simultaneous backwashing and chemical treatment of the resin beds, the regeneration time for the resin beds is significantly reduced.

BRIEF DESCRIPTION OF DRAWING

The single FIGURE of drawing shows a schematic diagram of a single vessel demineralizer system containing multiple beds of particulate resins in a series flow arrangement, together with provision for bed regeneration in accordance with the invention.

DESCRIPTION OF INVENTION

In the process of the invention, the water being demineralized is first contacted with resins in a bed in which the cation exchange resin is in the hydrogen form, then contacted with a bed of an anion exchange resin in the hydroxyl form, and the water then contacted with a bed containing a mixture of the cation and anion type resins. The metallic cations in the water are exchanged for hydrogen ions, and acid forming anions are exchanged for hydroxyl ions. This process results in removal of dissolved salts and their replacement by hydrogen and hydroxyl ions, which combine to provide substantially pure demineralized water. The feed water is flowed through the resin beds until dissolved solids such as calcium, magnesium, sodium, chloride, alkaline and silica ions begin to appear in the water effluent, thereby indicating that the resin beds are no longer able to provide hydrogen and hydroxyl ions and that regeneration of the beds by removal of the dissolved solids by acid or caustic sluicing is necessary. For regeneration of the resins, the beds can be flushed both individually and collectively, with the upper and lower beds having provision for individual flushing.

The demineralizer system of this invention is suitable for treating water having dissolved solids and is particularly useful at water temperatures between about 70°–150° F. and pressures of about 5–150 psig.

As shown in the drawing, a single demineralizer vessel 10 contains upper bed 12 of a cation resin material, supported by porous support means such as a screen or perforated plate 13, an intermediate bed 14 of an anion resin material supported by a screen or perforated plate 15, and lower bed 16 comprising a mixture of cation and anion type resins. A useful cation resin material is sulfonated styrene divinylbenzene resins, available as Rohm and Haas IR 120. A useful anion resin is trimethylamine, derivative copolymer obtainable as Rohm and Haas IRA 402. Each bed has a depth of at least about 2 feet and usually should not exceed about 6 feet, with 3–5 feet bed depth being preferred.

In operation, raw feed water provided at inlet connection 20 enters the vessel 10 and passes through distributor 21 downwardly into the upper bed 12 of cation resin. In cation bed 12, the mineral ions consisting principally of calcium, magnesium and sodium in the water are exchanged for hydrogen ions contained in the cation resin bed.

From cation resin bed 12, the feed water next passes downwardly through the intermediate bed 14 containing anion resin particles or beads. In bed 14, the sulfate, chloride, alkalinity and silica in the water are further exchanged with hydroxyl ions from the anion resin material.

From the anion bed 14, the feed water next passes downwardly through mixed bed 16 containing a mixture of cation and anion resins to further remove any remaining dissolved solids not previously removed in the separate cation and anion resin beds. The demineralized water is withdrawn at lower distributor 27 and outlet 30 and passed to its intended usage, such as for boiler feed water in a steam power plant. As is shown in the drawing, the water preferably flows downwardly through each of the beds in series, so as to avoid undesired fluidization of the beds and attrition of the resin particles therein.

The cation and anion resin particles used in each bed 12, 14, and 16 should have particle size smaller than about 16 mesh (U.S. Sieve Series) (0.0394 inch), and usually should not be smaller than about 50 mesh (0.010 inch). For the mixed bed 16, the volume ratio of cation to anion resin should be in a range of from about 2/1 to about $\frac{2}{3}$.

Although the water demineralizer system and method of the present invention is most conveniently and preferably provided in a single vessel as shown in the drawing, the cation bed 12 and anion bed 14 can alternatively be provided in a first vessel, and mixed bed 16 containing cation and anion resins provided in a second vessel, with appropriate interconnections being provided between the two vessels for water flow and for regeneration of the beds.

After an extended period of water demineralization operation, such as at least about 12 hours, when the cation and anion resins are no longer able to adequately dermineralize the feed water, regeneration of the resin materials in the beds becomes necessary. After interrupting the feed water inlet flow, such regeneration is accomplished by first backwashing the mixed bed 16 and anion bed 14 with water. The backwash water is introduced into the vessel 10 at lower connection 28 and is collected through distributor 23, located between the cation bed 12 and anion bed 14. This backwash water upward flow causes substantial separation of the mixed cation and anion resins in the mixed bed 16. After the mixed resins in bed 16 are separated and the anion resin in bed 14 has been cleaned, then backwash of the cation bed 12 is initated with water injection at connection 29 through the distributor 23, with the water being collected through upper distributor 21 and outlet connection 22.

Following the backwashing steps for all three beds, acid and caustic chemicals are next injected into the resin beds to remove the dissolved mineral solids contained therein. The acid and caustic treatment steps can be performed by washing either with an acid such as sulfuric acid, or a caustic material such as sodium hydroxide. First a dilute acid solution is introduced to cation bed 12 at connection 31, and is collected at distributor 23 and withdrawn at outlet connection 39. During this acid treatment step for cation bed 12, which will usually last about thirty minutes, a small flow of dilution water is provided from connection 35 and is collected at outlet connection 39. Also, a dilute caustic solution is introduced at inlet connection 32 and through distributor 23, during the time that the dilute acid is being injected at connection 35 through the now separated cation resin in the mixed bed 16. Both the acid solution and the caustic solution are collected at distributor 25 located within bed 16 and withdrawn are connection 26.

To rinse out the beds using a slow rinse step, so as to remove residual acid and caustic solution from the resin beds, dilution water is continued as described above, except that the supply of acid and caustic solutions are terminated. The slow rinse step usually lasts about thirty minutes.

Next separate fast rinses of the cation resin bed 12 and the anion resin bed 14 and anion resin in the mixed bed are accomplished sequentially by injecting water from upper connection 20 and collected through connections 33 and 26, respectively. Fast rinse of cation resin in the mixed bed 16 can be done after completion of the anion rinse; and rinse water is collected at the outlet 34 Following the fast rinse step, a drain down of the water from above the cation bed 12 is necessary. The water level can be monitored at connection 18 located 6–12 inches above the surface 12a of cation bed 12. Next, air mixing of the mixed resin bed 16 is accomplished by injecting pressurized air at lower connection 36 and venting it through upper distributor 21 and vent connection 38 or through a separate vent outlet at the highest point of the vessel.

As a final step of regeneration of the resin beds, a simultaneous fast rinse of all three beds is conducted, with water being introduced at the upper feed connection 20 and withdrawn at the lower most rinse outlet 34.

The valves and piping connections to the resin beds located at the vessel upper and lower ends as described above and used for backwashing, chemical treatment, and rinsing the resin beds are preferably provided as a separate module or unit, which is factory assembled for improved ease and lower cost of installation at the construction site.

Although the invention has been described broadly and in terms of a preferred embodiment, it will be understood that modifications can be made to the system and method all within the scope of the invention, which is defined by the following claims.

What I claim is:

1. A system for demineralizing water using multiple beds of ion exchange resins connected in series flow arrangement within a single vessel, comprising:
   (a) a pressurizable vessel containing three beds of ion exchange resins;
   (b) a first bed containing a cation type particulate resin material, said bed being located in the upper portion of said vessel and supported on porous support means;
   (c) a second bed containing an anion type particulate resin, said bed located in the middle portion of said vessel and vertically separated from said first bed and supported on porous support means;
   (d) a flow distrubutor located between said first and second beds for introduction and withdrawal of liquids therebetween;
   (e) a third bed containing mixed cation and anion type particulate resins located in the lower portion of said vessel and vertically separated from said second bed, said third bed having a flow distributor located within the bed for withdrawal of liquids; and
   (f) conduit and valve means connected to said vessel and arranged for feeding raw water and withdrawing demineralllized water and for flushing and regenerating said resin beds, whereby the raw feed water enters at the top of said vessel and flows downwardly through the three resin beds in series flow arrangement to demineralize the water.

2. The water demineralizing system of claim 1, wherein the resin particle size is 16-50 mesh (U.S. Sieve Series).

3. The water demineralizing system of claim 1, wherein said resin beds each have a depth of 2-6 feet.

4. The water demineralizing system of claim 1, wherein said first and third beds have provision for spearate backwashing and regeneration of the resins therein.

5. The water demineralizing system of claim 1, wherein said third bed contains a mixture of cation and anion resins in a volume ration range of cation to anion resin of 2/1 to $\frac{2}{3}$.

6. The water demineralizer system of claim 1, wherein said conduit and valve means are provided as a separate module connected to the demineralizer vessel.

7. The water demineralizer system of claim 1, wherein said cation and anion resin beds are each supported on a porous plate.

8. A system for demineralizing water using multiple beds of ion exchange resins arranged in a series flow arrangement in a single vessel, comprising:
   (a) a pressurizable vessel containing three beds of particulate ion exchange resins;
   (b) an upper first bed containing cation resins of 16-50 mesh size (U.S. Sieve Series), said bed being supported on a porous plate and having a depth of 2-6 feet;
   (c) an intermediate second bed containing anion resins of 16-50 mesh size (U.S. Sieve Series), said bed being vertically separated from said upper bed and supported on a porous plate and having a depth of 2-6 feet;
   (d) a flow distributor located between said upper and intermediate beds for introduction and withdrawal of liquids therebetween;
   (e) a lower third bed vertically separated from said intermediate bed and containing a mixute of particulate cation and anion resins, said mixutre having a cation to anion volume ratio of 2/1 to $\frac{2}{3}$;
   (f) a flow distributor located within said lower bed for withdrawal of liquids; and
   (g) conduit and valve means connected to said vessel and arranged for feeding raw water and withdrawing demineralized water and for flushing and regenerating the multiple resin beds, whereby the raw feed water enters the top of said vessel and flows downwardly through the three resin beds in series flow arrangement to demineralized the water.

9. A method of demineralizing water using three beds of ion exchange resins arranged in series flow arrangement within a single vessel, said method comprising;
   (a) flowing raw feed water sucessively through a cation resin bed, an anion resin bed, and a bed of mixed cation and anion resins to substantially remove dissolved mineral solids from the water;
   (b) then backflushing said anion and mixed resin beds with water and separating the cation and anion resins in the mixed bed;
   (c) backflushing said cation resin bed with water;
   (d) chemically treating the cation and anion resins with a dilute acid and with caustic solutions respectively, to remove dissolved solids from the resins in said beds and regenerate the resins; and
   (e) rinsing the resin beds with water prior to reuse for demineralizing raw feed water.

10. A method for demineralizing water according to claim 9, wherein said dissolved solids include ions of calcium, magnesium, sodium, sulfates and silica.

11. A method for demineralizing water according to claim 9, wherein after step (d) the resin beds are rinsed by injecting water simulataneously into the vessel about the cation bed and below the mixed bed, and withdrawing the water from an intermediate distributor located in the mixed bed.

12. A method for demineralizing water according to claim 9, wherein said acid solution is dilute sulfuric acid and said caustic solution material is dilute sodium hydroxide.

13. A method for demineralizing water according to claim 9, wherein the cation and anion resins in the mixed bed are separated by flushing step (b) into an upper anion portion and a lower cation portion and the portions are acid and caustic treated, regenerated and washed simultaneously.

14. A method for demineralizing water according to claim 9, wherein after step (d) the resin particles in the mixed resin bed are air mixed together by injecting pressurized air below the mixed bed and removing the air from above the cation bed.

15. A method for demineralizing water using three beds of ion exchange resins contained within a single vessel, said method comprising:
   (a) flowing raw feed water successively through a cation resin bed, an anion resin bed, and a bed of mixed cation and anion resins to substantially remove dissolved mineral solids from the water by exchanging the metal ions in the water for hydrogen ions in the resins;

(b) backflushing said anion and mixed resin beds with water and separating the cation and anion resins in the mixed bed;
(c) backflushing said cation resin bed with water;
(d) chemically treating the cation resin with a dilute acid solution and treating the anion resin with a dilute caustic solution to remove dissolved solids from the resins in said beds and regenerate the resins;
(e) rinsing the resin beds with water;
(f) remixing the particulate resins in said mixed bed by air injection therein; and
(g) final flushing said three resin beds with water prior to resue for demineralizing raw feed water.

* * * * *